(12) United States Patent
Shaheen

(10) Patent No.: US 8,109,701 B2
(45) Date of Patent: Feb. 7, 2012

(54) CUTTING HEAD OF A REAMER

(75) Inventor: Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 781 days.

(21) Appl. No.: 12/246,854

(22) Filed: Oct. 7, 2008

(65) Prior Publication Data

US 2009/0110503 A1    Apr. 30, 2009

(30) Foreign Application Priority Data

Oct. 28, 2007 (IL) .......................................... 186967

(51) Int. Cl.
*B23D 77/00* (2006.01)
(52) U.S. Cl. ....................... 408/227; 407/116
(58) Field of Classification Search .......... 408/223–224, 408/227, 229, 230; 407/116; *B23D 77/00, B23D 77/02, 77/12*
See application file for complete search history.

(56) References Cited

U.S. PATENT DOCUMENTS

| | | | | |
|---|---|---|---|---|
| 3,199,381 A * | 8/1965 | MacKey | ...................... | 408/226 |
| 3,504,413 A * | 4/1970 | Matsche, Jr. et al. | .......... | 407/113 |
| 5,201,616 A * | 4/1993 | Alverio | .......................... | 408/224 |
| 5,338,135 A * | 8/1994 | Noguchi et al. | .............. | 408/233 |
| 5,474,406 A * | 12/1995 | Kress et al. | ..................... | 408/199 |
| 5,954,459 A * | 9/1999 | Noguchi et al. | ................. | 408/59 |
| 6,012,881 A | 1/2000 | Scheer | | |
| 6,872,035 B2 * | 3/2005 | Kress et al. | .................... | 408/1 R |
| 2007/0041801 A1 * | 2/2007 | Randecker et al. | ............ | 408/229 |

FOREIGN PATENT DOCUMENTS

| | | | | |
|---|---|---|---|---|
| DE | 4102716 | | | 8/1991 |
| DE | 19903276 | | | 8/2000 |
| JP | 03245914 | A | * | 11/1991 |
| JP | 08-323541 | | | 12/1996 |
| JP | 10071516 | A | * | 3/1998 |
| JP | 2000107920 | A | * | 4/2000 |
| JP | 2001322029 | A | * | 11/2001 |
| JP | 2002307221 | A | * | 10/2002 |
| JP | 2003062712 | A | * | 3/2003 |
| JP | 2005313287 | A | * | 11/2005 |
| JP | 2007044833 | A | * | 2/2007 |
| WO | 2005/107987 | | | 11/2005 |

OTHER PUBLICATIONS

International Search Report in PCT/IL2008/001355; dated Mar. 12, 2009.

* cited by examiner

*Primary Examiner* — Daniel Howell
(74) *Attorney, Agent, or Firm* — Womble Carlyle

(57) ABSTRACT

A cutting head of a reamer has a cutting head forward end, a cutting head rear end distal the cutting head forward end, and a peripheral surface therebetween. The peripheral surface has at least two wiping pads that extend rearwardly from the cutting head forward end. At least one cutting section extends between two consecutive wiping pads and has a chip evacuation flute that extends rearwardly from the cutting head forward end and a cutting edge that is formed at the intersection of a rake surface and a relief surface. A chip former extends rearwardly from the rake surface. The chip former has a front portion that is slanted rearwardly and downwardly from the rake surface, and, a rear portion that is slanted rearwardly and upwardly with respect to the rake surface. A rear end of the rear portion joins the chip evacuation flute and form therewith a forming internal angle.

15 Claims, 4 Drawing Sheets

CUTTING HEAD OF A REAMER

FIELD OF THE INVENTION

The present invention relates to rotary cutting tools for performing reaming operations.

BACKGROUND OF THE INVENTION

Known rotary cutting tools for performing reaming operations typically comprise a cutting head having an axis of rotation. The cutting head has a forward end and a peripheral surface extending rearwardly therefrom. The peripheral surface comprises at least two wiping pads extending rearwardly from the forward end. At least one cutting edge extends from the forward end to the peripheral surface. The cutting edge is formed at the intersection of a forward end of a chip evacuation flute and a relief surface, wherein the chip evacuation flute constitutes the rake surface of the cutting edge.

Such a construction encounters a disadvantage in that the chip that is produced during a cutting operation flows directly into the chip evacuation flute, thus lacking possibility to control the edge geometry and the chip formation, especially when different workpiece materials need to be machined. Consequently, a compromise within the cutting conditions should be made, thereby negatively affecting the productivity of the tool.

In known reaming cutting heads that are an integral one-piece solid carbide unit, the cutting edges are made at the intersection of a rake surface and a relief surface, whereby the rake surface and the relief surface are typically made by grinding at least at the vicinity of the cutting edge. At this kind of reaming cutting heads, the rake surface is an integral part of the chip evacuation flute and, therefore, the cutting edge is not provided with a chip former for controlling the chip formation.

It is an object of the present invention to provide a cutting head for a reamer that has a chip former.

SUMMARY OF THE INVENTION

In accordance with the present invention there is provided a cutting head of a reamer having an axis of rotation A and a defined direction of rotation, the cutting head comprising:

a cutting head forward end, a cutting head rear end distal the cutting head forward end and a peripheral surface therebetween, the peripheral surface comprising at least two wiping pads extending rearwardly from the cutting head forward end, the peripheral surface between two consecutive wiping pads forming a peripheral section, at least one peripheral section forming a cutting section, the cutting section comprising:

a chip evacuation flute that extends rearwardly from the cutting head forward end, a cutting edge formed at the intersection of a rake surface, that generally faces the direction of rotation, and a relief surface, the cutting edge extends from the adjacent wiping pad to the cutting head forward end and is transversely directed to the axis of rotation, wherein:

a chip former extends rearwardly from the rake surface.

Generally, the chip former has a front portion and a rear portion, the front portion of the chip former is slanted rearwardly from the rake surface, the rear portion of the chip former is slanted rearwardly and upwardly with respect to the rake surface, a rear end of the rear portion joins the chip evacuation flute and forms therewith a forming internal angle (α).

Typically, the forming internal angle (α) is in the range of 100° to 150°.

Generally, the front portion of the chip former is slanted rearwardly and downwardly at a chip forming angle (γ) with respect to a first imaginary line that passes through the cutting edge and is parallel to a second imaginary line that is tangent to the chip evacuation flute at a front leading surface of the chip evacuation flute, as seen in a cross-section of the chip former taken in a plane perpendicular to the cutting edge.

Typically, the chip forming angle (γ) is in the range of 0° to 30°.

If desired, the cutting edge is distanced a first tangential distance from a second imaginary line that is tangent to the chip evacuation flute at a front leading surface of the chip evacuation flute, as seen in a cross-section of the chip former taken in a plane perpendicular to the cutting edge.

Typically, the first tangential distance is in the range of 0.0 mm to 0.3 mm.

In some embodiments, the chip former extends rearwardly and radially inwardly from the rake surface.

If desired, an axial land extends rearwardly from a radially outermost rear end of the chip former, the axial land joins the chip evacuation flute at a leading edge of the axial land and the wiping pad at a trailing edge of the axial land.

Generally, a cutting edge wedge angle (β) is formed between the rake surface and the relief surface, as seen in a cross-section of the chip former taken in a plane perpendicular to the cutting edge.

Typically, the cutting edge wedge angle (β) is in the range of 50° to 100°.

In some embodiments, the rear end of the rear portion of the chip former forms a chip former rear end angle (δ) with the cutting edge, as seen in a plan view of the chip former.

Typically, the chip former rear end angle (δ) is in the range of 0° to 20°.

Generally, the axial land forms an axial land angle (θ) with a radial line that extends from the trailing edge of the axial land to the axis of rotation, as seen in a cross-section of the cutting head taken in a plane perpendicular to the axial land.

Typically, the axial land angle (θ) is in the range of 5° to 85°.

Advantageously, the trailing edge of the axial land is located a second tangential distance higher than a radially outermost end of the cutting edge, as seen in a front view of the cutting head.

Typically, the cutting head is an integral one-piece solid carbide unit.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
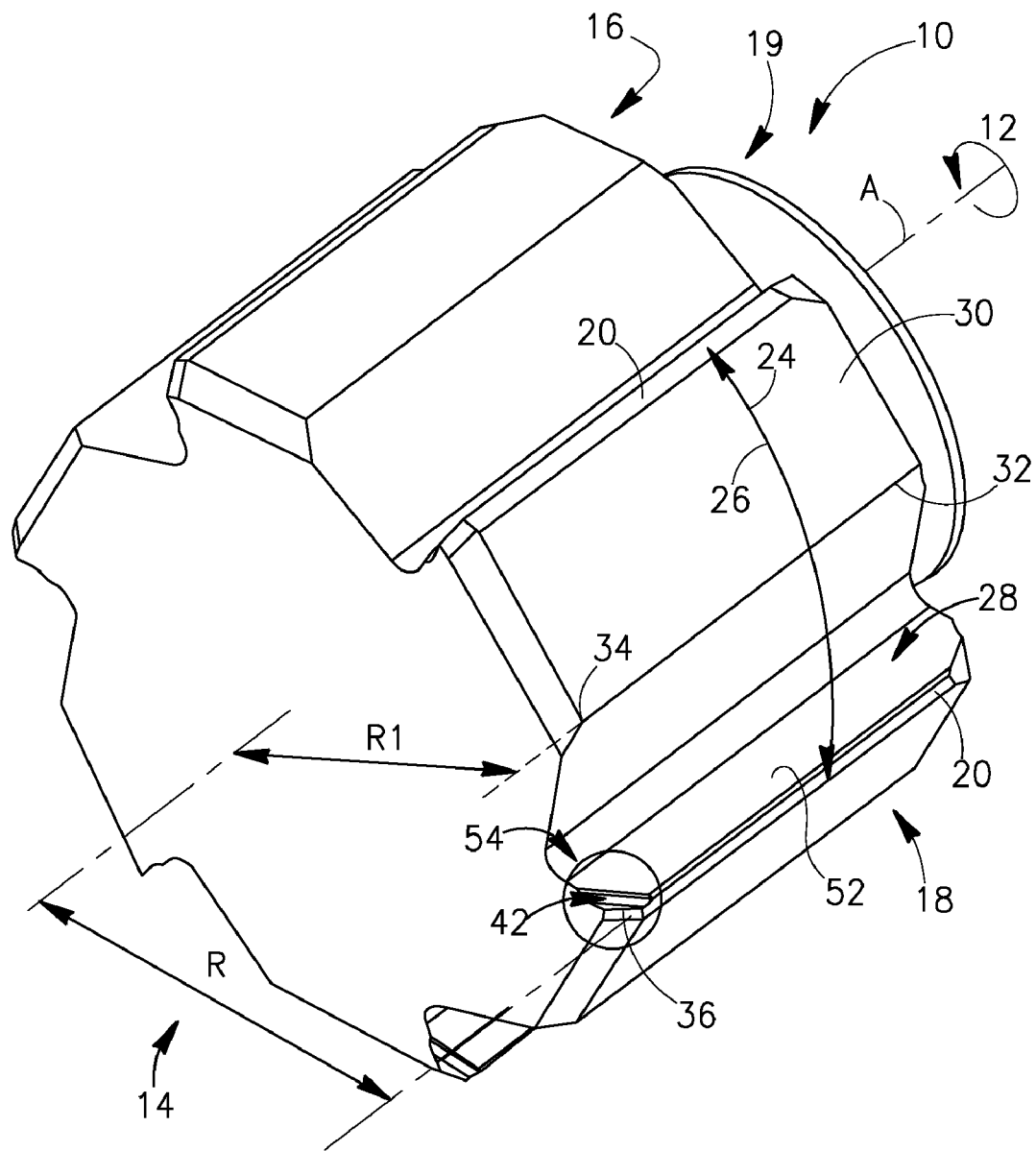
FIG. 1 is a perspective view of a cutting head of a reamer in accordance with the present invention.
Figure 2:
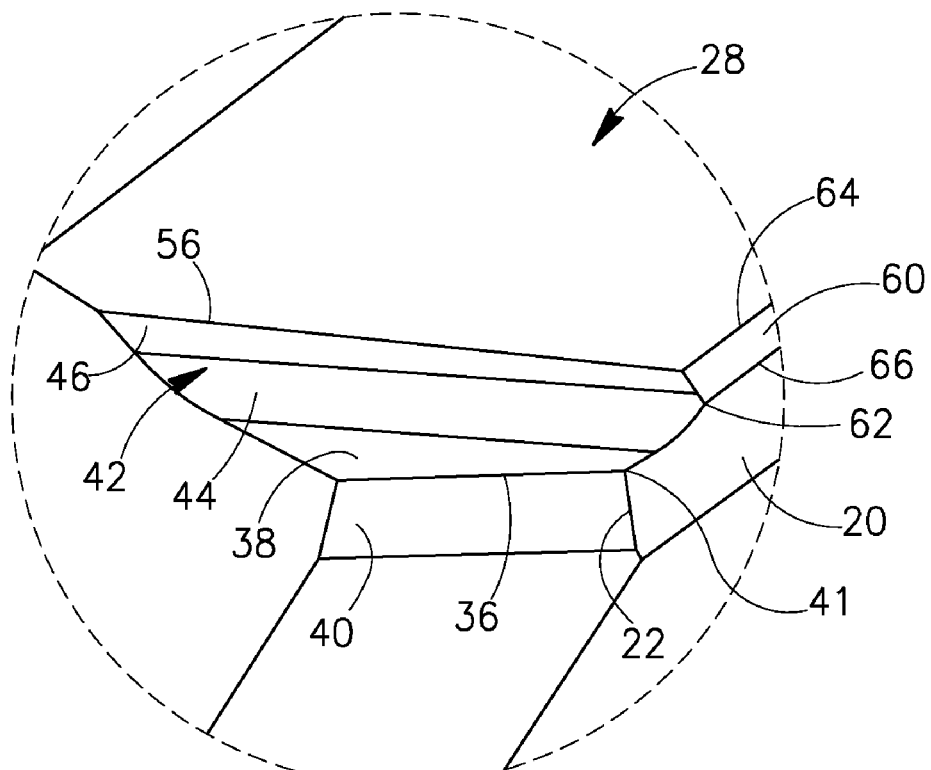
FIG. 2 is an enlarged view of the encircled chip former of FIG. 1.
Figure 3:
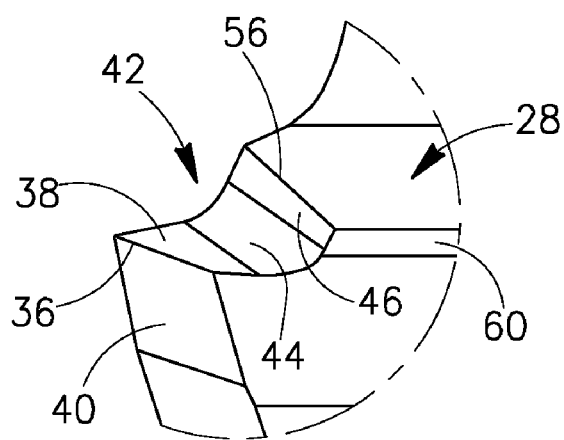
FIG. 3 is a side perspective view of the chip former of FIG. 2.
Figure 4:
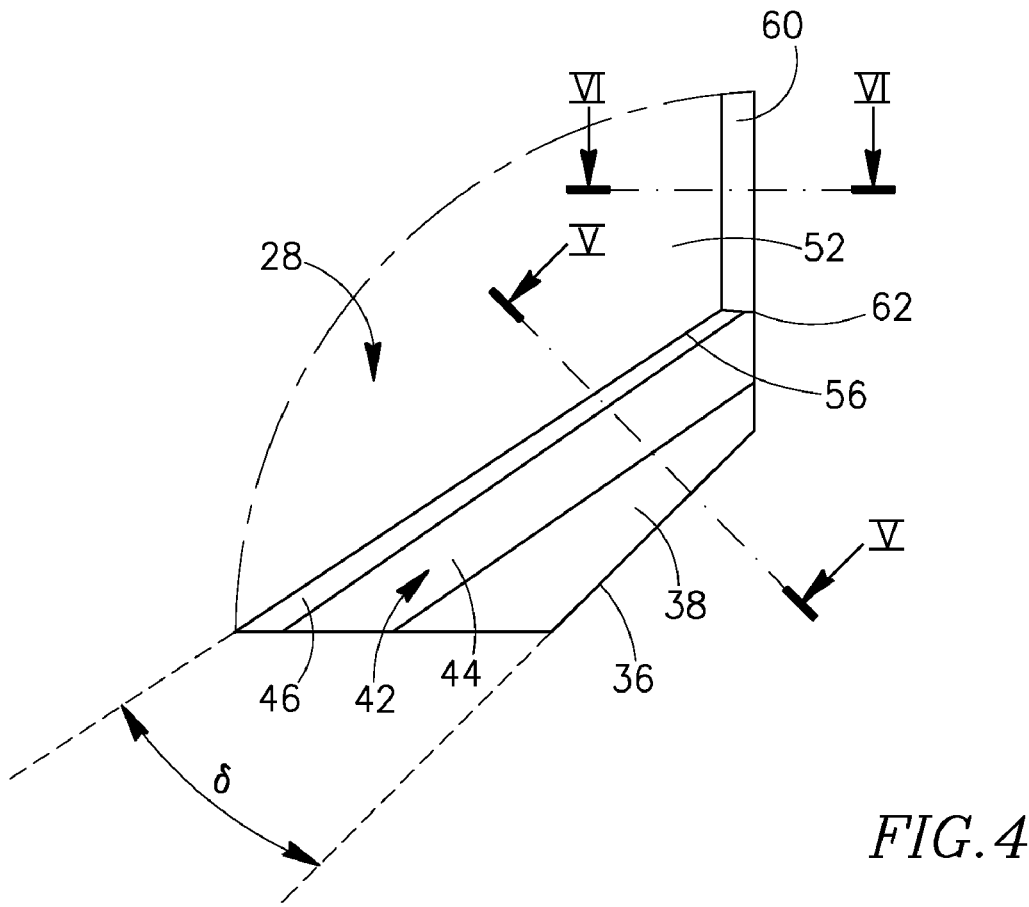
FIG. 4 is a plan view of the chip former of FIG. 2.
Figure 5:
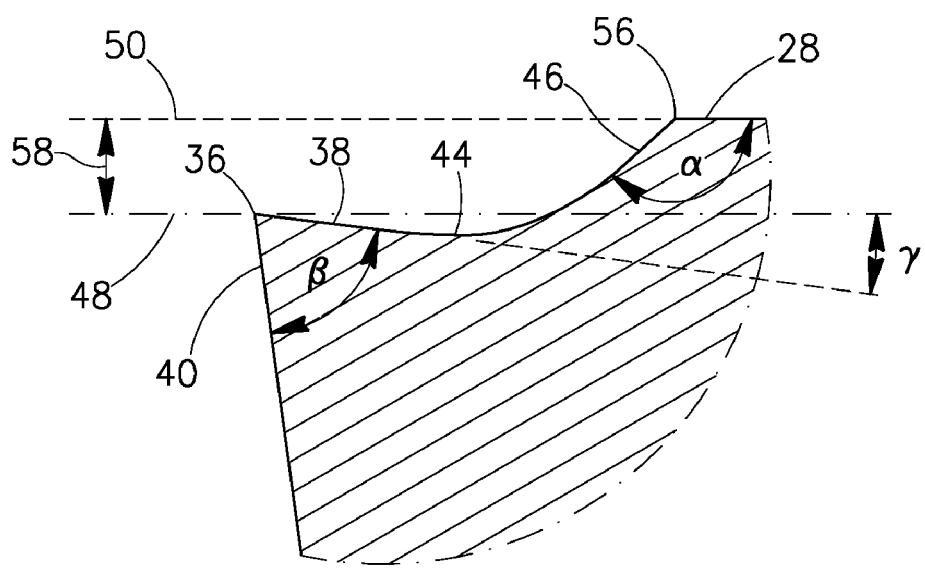
FIG. 5 is a cross-sectional view of the chip former taken along line V-V in FIG. 4.

Attention is drawn to the figures. A cutting head 10 of a reamer in accordance with the present invention may be formed as an integral part of a tool holder, fixedly brazed to a tool holder, or, may be detachably connected thereto. The cutting head 10 may be integrally made from sintering carbide powders.

The cutting head 10 has an axis of rotation A and a defined direction of rotation 12. The cutting head 10 has a cutting head forward end 14, a cutting head rear end 16 and a peripheral surface 18 therebetween. The cutting head 10 may also have a mounting portion 19 which extends rearwardly of the cutting head rear end 16. The peripheral surface 18 comprises a plurality of wiping pads 20 that extend rearwardly from the cutting head forward end 14. Each of the wiping pads 20 has a forwardmost end 22 that defines a cutting radius R. The peripheral surface 18 between two consecutive wiping pads 20 forms a peripheral section 24. According to a specific embodiment of the present invention, each of the peripheral sections 24 functions as a cutting section 26. However, there are embodiments wherein only one peripheral section functions as a cutting section. A cutting section is a peripheral section having cutting capabilities. The construction of a cutting section 26 will now be described in detail.

A chip evacuation flute 28 extends rearwardly from the cutting head forward end 14 to the cutting head rear end 16. A clearance surface 30 circumferentially precedes the chip evacuation flute 28 and joins therewith at a clearance edge line 32.

A cutting edge 36 is formed at the intersection of a rake surface 38 that generally faces the direction of rotation 12, and a relief surface 40 that extends circumferentially behind the rake surface 38. The cutting edge 36 extends from an adjacent wiping pad 20 to the cutting head forward end 14 and is transversely directed to the axis of rotation A. A radially outermost end 41 of the cutting edge 36 defines a cutting radius R. The forwardmost end 22 of the wiping pad 20 stays on the cutting radius R. A radial extremity 34 of the clearance edge line 32 is distanced a first radial distance R1 from the axis of rotation A. The first radial distance R1 is smaller than the cutting radius R.

A chip former 42 extends rearwardly and radially inwardly from the rake surface 38. The chip former 42 has a front portion 44 and a rear portion 46. The front portion 44 of the chip former 42 is slanted rearwardly and downwardly at a chip forming angle γ with respect to a first imaginary line 48. The first imaginary line 48 passes through the cutting edge 36 and is parallel to a second imaginary line 50. The second imaginary line 50 is tangent to the chip evacuation flute 28 at a front leading surface 52 of the chip evacuation flute 28 and at a front portion 54 of the chip evacuation flute 28, as seen in a cross-section of the chip former 42 taken in a plane perpendicular to the cutting edge 36. Typically, the chip forming angle γ is in the range of 0° to 30°. In one embodiment, the chip forming angle γ is in the range of 5° to 15°.

The rear portion 46 of the chip former 42 is slanted rearwardly and upwardly with respect to the rake surface 38. A rear end 56 of the rear portion 46 of the chip former 42 joins the chip evacuation flute 28 and forms therewith a forming internal angle α. Typically, the forming internal angle α is in the range of 100° to 150°. In one embodiment, the forming internal angle α is in the range of 115° to 135°.

In order to increase the efficiency of the chip former 42, the cutting edge 36 is distanced a first tangential distance 58 from the second imaginary line 50, as seen in a cross-section of the chip former 42 taken in a plane perpendicular to the cutting edge 36. In one embodiment, the first tangential distance 58 may be in the range of 0.0 to 0.3 mm.

In order to assure the desired geometry of the chip former 42 adjacent the wiping pad 20, the cutting head 10 is provided with an axial land 60. The axial land 60 extends rearwardly from a radially outermost rear end 62 of the chip former 42. The axial land 60 joins the chip evacuation flute 28 at a leading edge 64 of the axial land 60 and the wiping pad 20 at a trailing edge 66 of the axial land 60. The axial land 60 forms an axial land angle θ with a first radial line 68 extending from the trailing edge 66 of the axial land 60 to the axis of rotation A, as seen in a cross-section of the cutting head 10 taken in a plane perpendicular to the axial land 60. Typically, the axial land angle θ is in the range of 5° to 85°. In one embodiment, the axial land angle θ is in the range of 20° to 70°. In another embodiment, the axial land angle θ is in the range of 35° to 55°.

Figure 6:
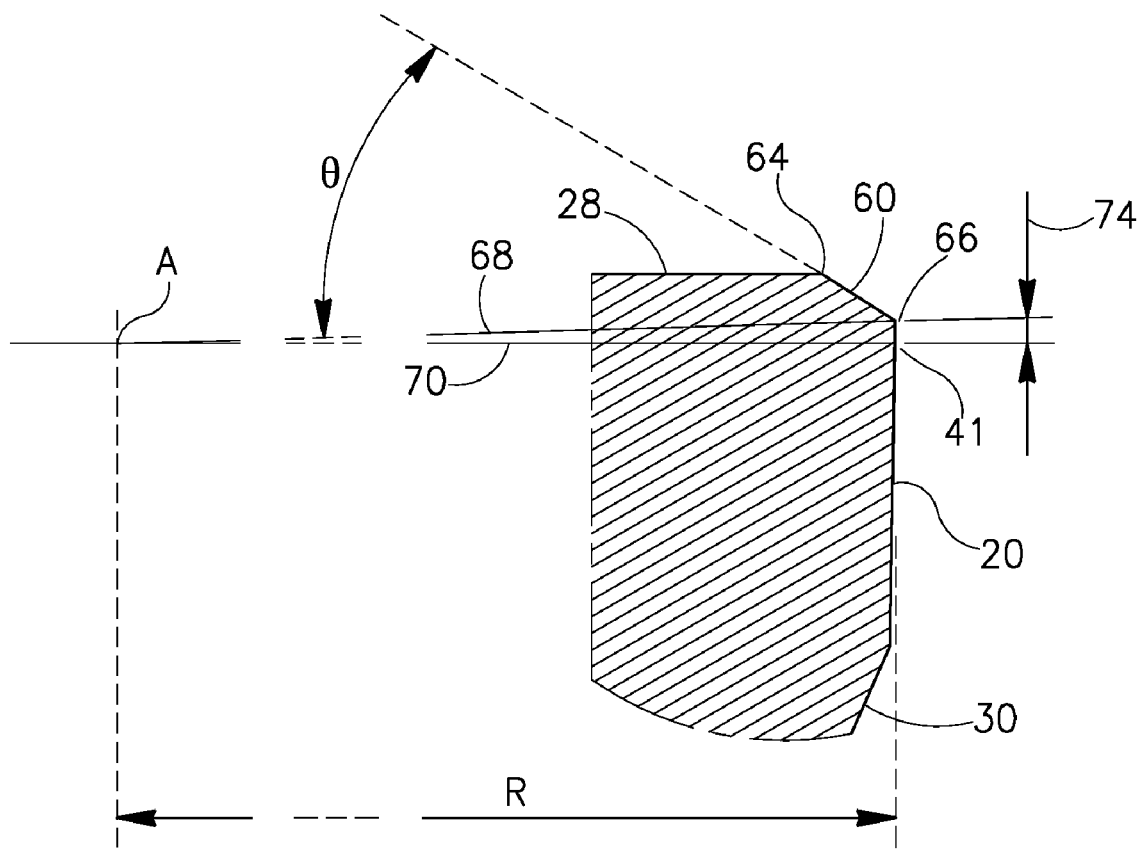
FIG. 6 is a cross-sectional view of the axial land taken along line VI-VI in FIG. 4.

FIG. 6 is a cross-sectional view of the axial land 60 taken perpendicularly to the axial land 60, i.e., when the cutting head 10 is viewed from the cutting head forward end 14. Therefore, for sake of clarity, a second radial line 70 extending from the radially outermost end 41 of the cutting edge 36 to the axis of rotation A is shown in FIG. 6, even though it is not in the plane of the cross-section. The second radial line 70 is of the length of the cutting radius R, however, since the axis of rotation A is located outside the figure, the first radial line 68, the second radial line 70 and the cutting radius R are marked partially with dashed lines to represent that their actual length is much larger.

As seen in FIG. 6, the trailing edge 66 of the axial land 60 is located a second tangential distance 74 above the radially outermost end 41 of the cutting edge 36. The fact that the trailing edge 66 of the axial land 60 is located higher than the radially outermost end 41 of the cutting edge 36 as seen in a front view of the cutting head 10 enables to assure the desired geometry of the chip former 42 and adequate clearance of the non cutting portions of the cutting head 10 from the walls of a workpiece to be machined.

A cutting edge wedge angle β is formed between the rake surface 38 and the relief surface 40, as seen in a cross-section of the chip former 42 taken in a plane perpendicular to the cutting edge 36. Typically, the cutting edge wedge angle β is in the range of 50° to 100°. In one embodiment, the cutting edge wedge angle β is in the range of 60° to 90°. In another embodiment, the cutting edge wedge angle β is in the range of 65° to 80°.

It is advantageous to design the radial extent of the chip former 42 to the varying cutting speed along the length of the chip former 42 during machining. Therefore, the rear end 56 of the rear portion 46 of the chip former 42 forms a chip former rear end angle δ with the cutting edge 36, as seen in a plan view of the chip former 42. Typically, the chip former rear end angle δ is in the range of 0° to 20°. In one embodiment, the chip former rear end angle δ is in the range of 5° to 15°. The rear end 56 of the rear portion 46 of the chip former 42 does not have to be a straight line, rather, it may have other geometries depending on the cutting requirements of the cutting head 10.

Although the present invention has been described to a certain degree of particularity, it should be understood that various alterations and modifications could be made without departing from the spirit or scope of the invention as hereinafter claimed. For example, the cutting head may be formed by flutes that extend peripherally between two adjacent wiping pads and extend rearwardly in a straight or spiral manner.

What is claimed is:

1. A cutting head (10) of a reamer having an axis of rotation (A) and a defined direction of rotation (12), the cutting head (10) comprising:
    a cutting head forward end (14), a cutting head rear end (16) distal the cutting head forward end (14) and a peripheral surface (18) therebetween, the peripheral surface (18) comprising at least two wiping pads (20) extending rearwardly from the cutting head forward end (14), a peripheral section located between two consecutive wiping pads (20), at least one peripheral section (24) being a cutting section (26), the cutting section (26) comprising:

a chip evacuation flute (28) that extends rearwardly from the cutting head forward end (14); and a cutting edge (36) formed at the intersection of a rake surface (38) that generally faces the direction of rotation (12), and a relief surface (40), the cutting edge (36) extending from the adjacent wiping pad (20) to the cutting head forward end (14) and being transversely directed to the axis of rotation (A), wherein:

a chip former (42) extends rearwardly from the rake surface (38);

an axial land (60) extends rearwardly from a radially outermost rear end (62) of the chip former (42), the axial land (60) joins the chip evacuation flute (28) at a leading edge (64) of the axial land (60) and the wiping pad (20) at a trailing edge (66) of the axial land (60);

the trailing edge (66) of the axial land (60) is located a second tangential distance (74) higher than a radially outermost end (41) of the cutting edge (36), as seen in a front view of the cutting head (10).

2. The cutting head (10) according to claim 1, wherein the chip former (42) has a front portion (44) and a rear portion (46), the front portion (44) of the chip former (42) is slanted rearwardly from the rake surface (38), the rear portion (46) of the chip former (42) is slanted rearwardly and upwardly with respect to the rake surface (38), a rear end (56) of the rear portion (46) joins the chip evacuation flute (28) and forms therewith a forming internal angle ($\alpha$).

3. The cutting head (10) according to claim 2, wherein the forming internal angle ($\alpha$) is in the range of 100° to 150°.

4. The cutting head (10) according to claim 2, wherein the front portion (44) of the chip former (42) is slanted rearwardly and downwardly at a chip forming angle ($\gamma$) with respect to a first imaginary line (48) that passes through the cutting edge (36) and is parallel to a second imaginary line (50) that is tangent to the chip evacuation flute (28) at a front leading surface (52) of the chip evacuation flute (28), as seen in a cross-section of the chip former (42) taken in a plane perpendicular to the cutting edge (36).

5. The cutting head (10) according to claim 4, wherein the chip forming angle ($\gamma$) is in the range of 0° to 30°.

6. The cutting head (10) according to claim 2, wherein the rear end (56) of the rear portion (46) of the chip former (42) forms a chip former rear end angle ($\delta$) with the cutting edge (36), as seen in a plan view of the chip former (42).

7. The cutting head (10) according to claim 6, wherein the chip former rear end angle ($\delta$) is in the range of 0° to 20°.

8. The cutting head (10) according to claim 1, wherein the cutting edge (36) is distanced a first tangential distance (58) from a second imaginary line (50) that is tangent to the chip evacuation flute (28) at a front leading surface (52) of the chip evacuation flute (28), as seen in a cross-section of the chip former (42) taken in a plane perpendicular to the cutting edge (36).

9. The cutting head (10) according to claim 8, wherein the first tangential distance (58) is in the range of 0.0 mm to 0.3 mm.

10. The cutting head (10) according to claim 1, wherein the axial land (60) forms an axial land angle ($\theta$) with a radial line (68) that extends from the trailing edge (66) of the axial land (60) to the axis of rotation (A), as seen in a cross-section of the cutting head (10) taken in a plane perpendicular to the axial land (60).

11. The cutting head (10) according to claim 10, wherein the axial land angle ($\theta$) is in the range of 5° to 85°.

12. The cutting head (10) according to claim 1, wherein a cutting edge wedge angle ($\beta$) is formed between the rake surface (38) and the relief surface (40), as seen in a cross-section of the chip former (42) taken in a plane perpendicular to the cutting edge (36).

13. The cutting head (10) according to claim 12, wherein the cutting edge wedge angle ($\beta$) is in the range of 50° to 100°.

14. The cutting head (10) according to claim 1, wherein the chip former (42) extends rearwardly and radially inwardly from the rake surface (38).

15. The cutting head (10) according to claim 1, wherein the cutting head (10) is an integral one-piece solid carbide unit.

* * * * *